(12) United States Patent
Kim et al.

(10) Patent No.: US 11,962,221 B2
(45) Date of Patent: Apr. 16, 2024

(54) MOTOR ASSEMBLY AND CLEANER COMPRISING SAME

(71) Applicant: Samsung Electronics Co., Ltd., Suwon-si (KR)

(72) Inventors: Seehyun Kim, Suwon-si (KR); Hwagyu Song, Suwon-si (KR); Sungcheol Lee, Suwon-si (KR); Ingyu Choi, Suwon-si (KR); Dokyung Lee, Suwon-si (KR); Yunsoo Jang, Suwon-si (KR); Seungryong Cha, Suwon-si (KR); Junggyun Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 355 days.

(21) Appl. No.: 17/309,356

(22) PCT Filed: Nov. 14, 2019

(86) PCT No.: PCT/KR2019/015513
§ 371 (c)(1),
(2) Date: May 20, 2021

(87) PCT Pub. No.: WO2020/130363
PCT Pub. Date: Jun. 25, 2020

(65) Prior Publication Data
US 2022/0021269 A1    Jan. 20, 2022

(30) Foreign Application Priority Data
Dec. 20, 2018    (KR) .................. 10-2018-0165769

(51) Int. Cl.
*A47L 9/22*    (2006.01)
*A47L 5/24*    (2006.01)
(Continued)

(52) U.S. Cl.
CPC .................. *H02K 5/24* (2013.01); *A47L 5/24* (2013.01); *A47L 9/0081* (2013.01); *A47L 9/22* (2013.01); *H02K 5/04* (2013.01); *H02K 7/14* (2013.01)

(58) Field of Classification Search
CPC .......... A47L 5/22–26; A47L 9/22; H02K 5/24
See application file for complete search history.

(56) References Cited

U.S. PATENT DOCUMENTS 9,848,745 B2    12/2017 Hill et al.
10,344,776 B2    7/2019 Lamb
(Continued)

FOREIGN PATENT DOCUMENTS

EP    2227998 A1    9/2010
JP    H05-84194 A    4/1993
(Continued)

OTHER PUBLICATIONS

International Search Report and Written Opinion of the International Searching Authority dated Feb. 20, 2020 in connection with International Application No. PCT/KR2019/015513, 12 pages.
(Continued)

*Primary Examiner* — Thomas Fink

(57) ABSTRACT

A cleaner according to the present disclosure comprises: a body; a suction head connected to one side of the body so as to suction foreign matter from a surface to be cleaned; and a motor assembly received in a motor case formed inside the body, so as to generate suction force, wherein: the motor assembly comprises a motor, an impeller disposed on one side of the motor and connected to the motor so as to introduce air, and a vibration isolator coupled to the other side of the motor and having a plurality of support protrusions protruding from the outer circumferential surface thereof; and the coupling between the plurality of support
(Continued)

protrusions and the motor case causes the motor assembly to be spaced apart from the motor case.

12 Claims, 6 Drawing Sheets

(51) Int. Cl.
*A47L 9/00* (2006.01)
*H02K 5/04* (2006.01)
*H02K 5/24* (2006.01)
*H02K 7/14* (2006.01)

(56) References Cited

U.S. PATENT DOCUMENTS

| | | | |
|---|---|---|---|
| 2001/0005919 A1 | 7/2001 | Worden et al. | |
| 2005/0123398 A1* | 6/2005 | Tam | A47L 5/22 415/211.2 |
| 2016/0037984 A1* | 2/2016 | Park | F04D 29/626 15/326 |
| 2018/0266426 A1* | 9/2018 | Lee | F04D 29/624 |
| 2018/0266438 A1* | 9/2018 | Hayamitsu | F04D 29/522 |
| 2019/0365167 A1* | 12/2019 | Jung | A47L 9/2889 |
| 2020/0124055 A1* | 4/2020 | Choi | F04D 17/168 |
| 2020/0217330 A1* | 7/2020 | Fujiwara | F04D 29/4226 |
| 2020/0217367 A1* | 7/2020 | Ikeno | H02K 5/15 |
| 2022/0079401 A1* | 3/2022 | Fujiwara | F04D 25/0606 |

FOREIGN PATENT DOCUMENTS

| | | | | |
|---|---|---|---|---|
| JP | 2000-354562 A | | 12/2000 | |
| JP | 2018-034038 A | | 3/2018 | |
| KR | 20-1999-0009503 U | | 12/1899 | |
| KR | 20-2000-0003457 U | | 1/2000 | |
| KR | 10-1068347 B1 | | 9/2011 | |
| KR | 10-1213305 B1 | | 12/2012 | |
| KR | 10-2018-0029110 A | | 3/2018 | |
| KR | 1020200076858 | * | 6/2020 | H02K 5/24 |

OTHER PUBLICATIONS

Korean Intellectual Property Office, "Office Action," issued Oct. 25, 2023, in connection with Korean Patent Application No. 10-2018-0165769, 11 pages.

* cited by examiner

CROSS-REFERENCE TO RELATED APPLICATIONS

This application is a 371 National Stage of International Application No. PCT/KR2019/015513, filed Nov. 14, 2019, which claims priority to Korean Patent Application No. 10-2018-0165769, filed Dec. 20, 2018, the disclosures of which are herein incorporated by reference in their entirety.

BACKGROUND

1. Field

The disclosure relates to a motor assembly improved to reduce noise and vibration and a cleaner comprising the same.

2. Description of Related Art

In general, a cleaner may be a device configured to suction air of a surface to be cleaned, separate and collect dust or contaminants from the suctioned air, and discharge purified air to the outside of a body.

The cleaner as described above may be divided into a cleaner of a canister type, a cleaner of an upright type, a handy-type cleaner, a stick-type cleaner, or the like according to a shape thereof.

The cleaner may include a motor which is driven to generate suction force. Vibrations generated by this motor may be transferred to a body of the cleaner and vibration noises may be generated. The vibrations and noise transferred to the outside in this manner not only cause the user displeasure, but there is also the disadvantage of using the cleaner being difficult in a space which requires cleaning in a quiet state. In particular, in the case of stick-type cleaners in which the motor is disposed near the handle, there is the disadvantage of the vibrations being easily transferred to the user.

SUMMARY

An aspect of the disclosure is to provide a motor assembly having an improved structure to reduce vibration and noise and a cleaner comprising the same.

According to an aspect of the disclosure, a motor assembly includes a body; a suction head configured to connect to one side of the body, and suction a foreign matter of a surface to be cleaned; and a motor assembly configured to be accommodated in a motor case formed inside the body, and generate suction force, and the motor assembly includes a motor; an impeller disposed at one side of the motor and configured to introduce air by being connected with the motor; and a vibration isolator configured to couple to other side of the motor, and include a plurality of support protrusions formed to protrude from an outer circumferential surface, and the motor assembly is configured to be disposed spaced apart with the motor case by the plurality of support protrusions and the motor case being coupled.

The vibration isolator may further include a side surface cover portion configured to surround a side surface of the motor; and a motor support portion configured to be extendingly formed to the inside of the side surface cover portion and support the other side of the motor.

The motor assembly may further include a cover including an inlet through which air is introduced by the impeller, and configured to cover the impeller, and the side surface cover portion may be configured so as to be supported by the cover, and disposed spaced apart from the side surface of the motor.

The plurality of support protrusions may be configured so as to be formed at the outer circumferential surface of the side surface cover portion.

The plurality of support protrusions may be comprised of a first support protrusion, a second support protrusion, and a third support protrusion which are disposed spaced apart at a mutually same angle.

The motor support portion may include a motor accommodation branch configured to accommodate a portion of the other side of the motor; and a plurality of connection branches configured to connect the side surface cover portion with the motor accommodation branch.

The connection branch may be configured to be disposed radially between the motor accommodation branch and the side surface cover portion.

The motor support portion may include a plurality of through-holes configured so that air introduced by the impeller is discharged.

The motor accommodation branch may have a maximum spacing angle on each of the plurality of support protrusions.

The motor accommodation branch may be comprised of a first motor accommodation branch, a second motor accommodation branch, and a third motor accommodation branch which are disposed spaced apart at mutually same angles, the plurality of support protrusions may be comprised of a first support protrusion, a second support protrusion, and a third support protrusion which are disposed spaced apart at mutually same angles, and an angle between the motor accommodation branch and the support protrusion adjacent to each other may be 60 degrees.

The motor case may include a plurality of coupling portions configured to be protrudingly formed in a coupling direction of the motor assembly, and couple with each of the plurality of support protrusions.

The motor assembly may further include an additional vibration isolator disposed between the cover and the motor case, and configured to space apart the motor from the motor case.

The additional vibration isolator may include a protrusion portion configured to be protrudingly formed along an inlet of the cover.

According to an embodiment of the disclosure, a motor assembly includes a motor; an impeller disposed at one side of the motor and configured to introduce air by being connected with the motor; and a vibration isolator coupled to other side of the motor, and configured so that a plurality of support protrusions is formed to radially protrude from an outer circumferential surface of the motor.

The vibration isolator may further include a side surface cover portion configured to surround a side surface of the motor; and a motor support portion configured to be extendingly formed to the inside of the side surface cover portion and support the other side of the motor.

The cover may include an inlet through which air is introduced by the impeller, and configured to cover the impeller may be further included, and the side surface cover portion may be configured so as to be supported by the cover and disposed spaced apart with a side surface of the motor.

The plurality of support protrusions may be configured to be formed at an outer circumferential surface of the side surface cover portion, and comprised of a first support protrusion, a second support protrusion, and a third support protrusion which are disposed spaced apart at mutually the same angles.

The motor support portion may include a motor accommodation branch configured to accommodate a portion of the other side of the motor; and a plurality of connection branches configured to connect the side surface cover portion with the motor accommodation branch, and be disposed radially between the motor accommodation branch and the side surface cover portion.

The motor support portion may be formed so as to include a plurality of through-holes through which air introduced by the impeller is discharged.

The motor accommodation branch may be comprised of a first motor accommodation branch, a second motor accommodation branch, and a third motor accommodation branch which are disposed spaced apart at mutually same angles, and the plurality of support protrusions may be comprised of a first support protrusion, a second support protrusion, and a third support protrusion which are disposed spaced apart at mutually same angles, and in-between the motor accommodation branch and the support protrusion adjacent to each other may have a maximum spacing angle.

The motor assembly according to an embodiment of the disclosure having a structure as described above may reduce vibration and noise according to the driving of motor.

DETAILED DESCRIPTION

One or more embodiments of a motor assembly and a cleaner comprising the same according to the disclosure will be described in detail below with reference to the accompanied drawings.

One or more embodiments described below are example embodiments provided to assist in the understanding of the disclosure, and it is to be understood that the disclosure may be implemented to various forms and various modifications may be applied thereto different from the embodiments described herein. However, in case it is determined that in describing embodiments, detailed description of related known technologies or elements may unnecessarily confuse the gist of the disclosure, the detailed description and detailed illustration will be omitted. In addition, to assist in the understanding of the disclosure, the accompanied drawings are not illustrated to its actual scale and sizes of some elements may be exaggeratedly illustrated.

Terms such as "first," "second," and so on may be used to describe a variety of elements, but the elements should not be limited by these terms. The terms may be used only for the purpose of distinguishing one element from another. For example, a first element may be designated as a second element without departing from the scope and spirit of the present disclosure, and similarly, the second element may also be designated as the first element.

The terms used in the embodiments of the disclosure may be interpreted to have meanings generally understood to one of ordinary skill in the art unless otherwise defined.

Terms such as 'tip-end,' 'rear-end,' 'upper portion,' 'lower portion,' 'upper end,' 'lower end,' or the like used in the disclosure have been defined based on the drawings, and it is to be understood that the form and location of each element is not limited by these terms.

Figure 1:
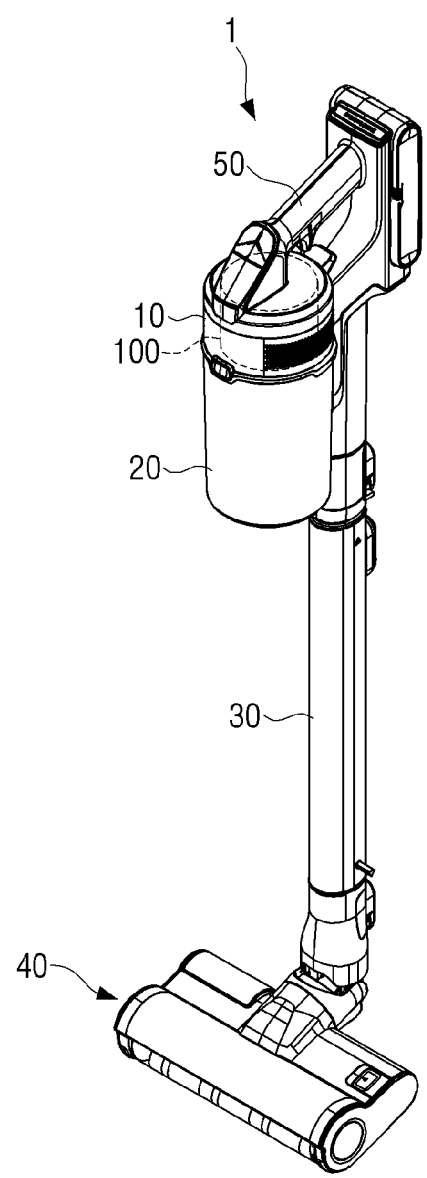
FIG. 1 is a perspective view illustrating a stick-type cleaner including a motor assembly according to an embodiment of the disclosure.

FIG. 1 is a perspective view illustrating a stick-type cleaner including a motor assembly according to an embodiment of the disclosure.

Referring to FIG. 1, a cleaner including a motor assembly 100 according to the disclosure may include a stick-type cleaner 1. However, the embodiment is not limited thereto, and for example, the motor assembly 100 according to the disclosure may be used in an upright-type cleaner.

In addition, the motor assembly 100 may be applied to a variety of home appliances other than the cleaner. The stick-type cleaner 1 including motor assembly 100 will be mainly described below.

The cleaner 1 may include a body 10 and a suction head 40. The cleaner 1 may include a stick 30 connecting the body 10 and the suction head 40 and a handle portion 50 connected with the body 10.

The handle portion 50 may, as a portion configured to couple to the body 10, be provided so that the user is able to grasp and operate the cleaner 1. The handle portion 50 may be provided with an operating portion 51 (referring to FIG. 2), and provided so that the user is able to control the cleaner 1.

The suction head 40 may be provided at a lower portion of the body 10, and disposed so as to contact with the surface to be cleaned. The suction head 40 may be provided to contact the surface to be cleaned, and introduce dust or filth of the surface to be cleaned to the inside of the body 10 with the suction force generated from the motor assembly 100.

The rear-end of the body 10 may be mounted with a separable dust collecting device 20. The dust collecting device 20 may separate foreign matter from the air suctioned from the suction head 40 and perform a dust collecting function.

The body 10 may include a motor assembly 100 which suctions and forcibly moves the air to the inside of the body 10. The body 10 may include a motor case 11 (referring to FIG. 2) which forms an accommodation space capable of accommodating the motor assembly 100 within.

The motor assembly 100 may be configured to generate power so as to generate suction force inside of the body 10.

The coupling structure of the motor assembly 100 and the motor case 11 will be described below.

Figure 2:
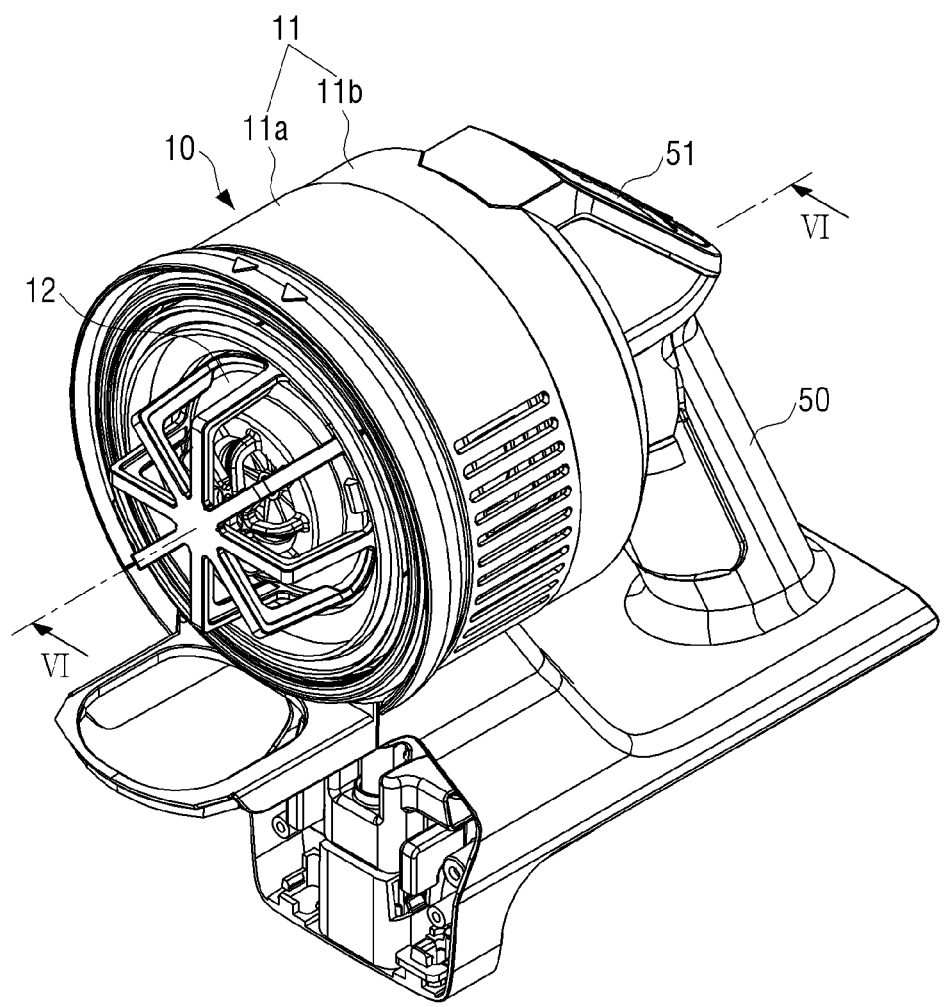
FIG. 2 is a perspective view illustrating a body of a cleaner according to an embodiment of the disclosure.
Figure 3:
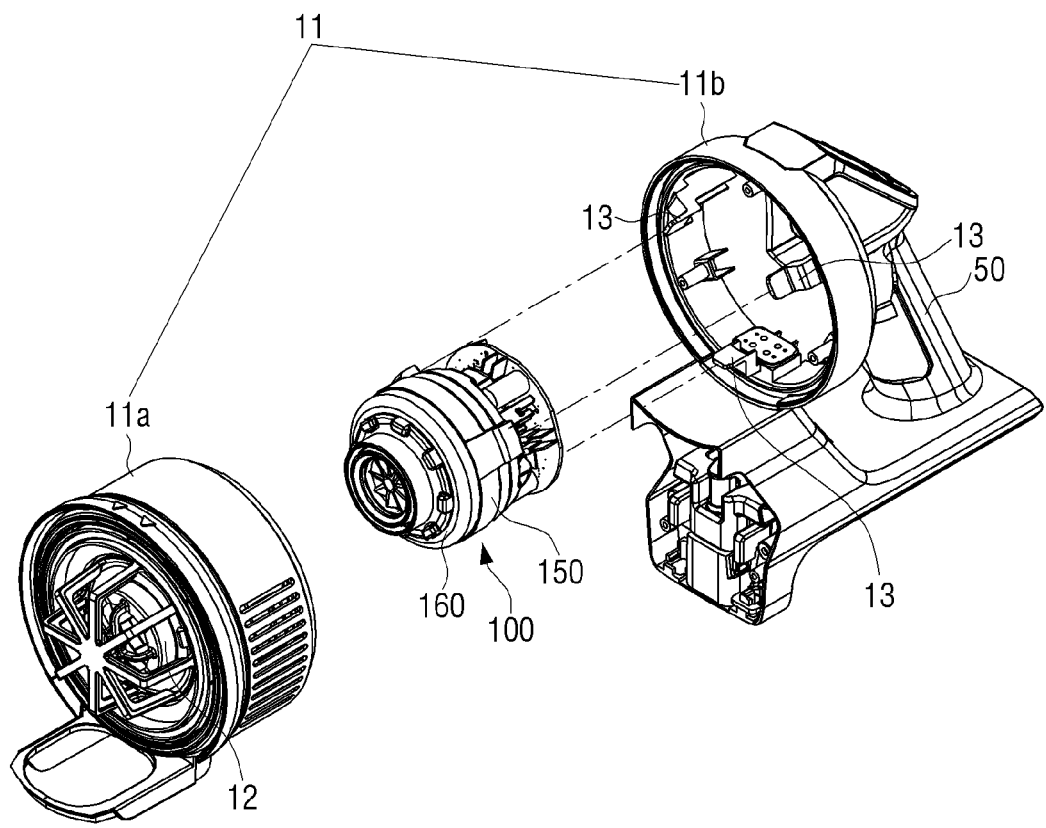
FIG. 3 is an exploded perspective view illustrating the body illustrated in FIG. 2.

FIG. 2 is a perspective view illustrating a body of a cleaner according to an embodiment of the disclosure, and FIG. 3 is an exploded perspective view illustrating the body illustrated in FIG. 2.

Referring to FIG. 2 and FIG. 3, the motor assembly 100 may be accommodated inside of the motor case 11, and configured as a part of the body 10.

The motor case 11 may be comprised of a first motor case 11a configured to couple to the upper side of the motor assembly 100 and a second motor case 11b configured to couple to the lower side of the motor assembly 100.

The upper portion of the motor assembly 100 may be coupled with the first motor case 11a having a motor suction port 12 of a predetermined form through which air via a dust collecting device is suctioned. Then, the lower portion of the motor assembly 100 may be coupled with the second motor case 11b which is connected with the handle portion 50.

The motor assembly 100 accommodated in the motor case 11 may include a vibration isolator 150. The vibration isolator 150 may be a member for minimizing the vibration generated by the motor (referring to FIG. 4) of the motor assembly 100 from being transferred to the body 10, and the vibration isolator 150 may be configured so that the motor assembly 100 is spaced apart from the motor case 11 by a certain distance. In addition, the vibration isolator 150 may be configured so that the portion in contact between the motor assembly 100 and the motor case 11 is minimized.

The vibration isolator 150 may be coupled to other side of the motor 110, and include a plurality of support protrusions 155 which is protrudingly formed in a radial shape from an outer circumferential surface of the motor 110.

The second motor case 11b may include a coupling portion 13 for coupling with the vibration isolator 150. Specifically, the coupling portion 13 of the second motor case 11b may be insertion coupled to the plurality of support protrusions 155.

The second motor case 11b may be coupled so as to be in contact with the motor assembly 100 only by the support protrusion 155 of the vibration isolator 150 and the coupling portion 13.

Because the motor assembly 100 according to an embodiment of the disclosure couples in a point contact structure in only some sections by the second motor case 11b and the vibration isolator 150, the vibration generated by the motor 110 may be transferred to the second motor case 11b and the vibration noise generated may be effectively prevented.

In addition, the motor assembly 100 may be coupled to the upper side of the motor 110, and an additional vibration isolator 160 which separates the motor assembly 100 from the first motor case 11a may be further included.

The first motor case 11a may be coupled with the motor assembly 100 so as to be in contact with only the additional vibration isolator 160 of the motor assembly 100.

The detailed configuration of the motor assembly according to an embodiment of the disclosure will be described below.

Figure 4:
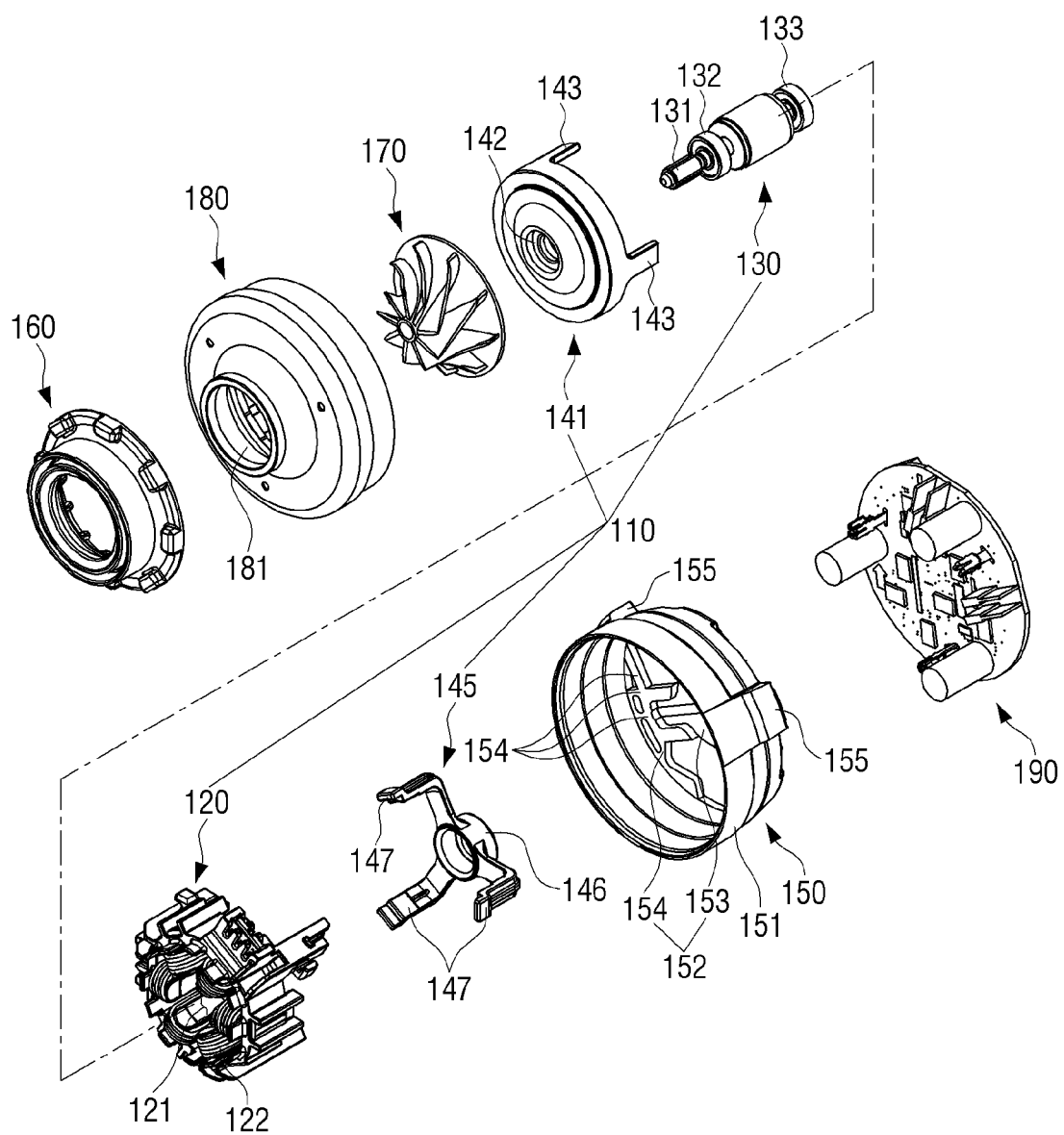
FIG. 4 is an exploded perspective view illustrating the motor assembly illustrated in FIG. 3.

FIG. 4 is an exploded perspective view illustrating the motor assembly illustrated in FIG. 3.

Referring to FIG. 4, the motor assembly 100 may include a motor 110 including a stator 120 and a rotor 130, and housings 141 and 145, an impeller 170 configured to couple to a rotation shaft 131 of the rotor 130 and generate movement of air, a cover 180 configured to cover the impeller 170 and guide the air suctioned by the impeller 170, a vibration isolator 150 configured to absorb the vibration of the motor 110, and a substrate 190 configured to control the motor 110.

The motor may include the stator 120 and the rotor 130, and housings 141 and 145.

The stator 120 may be configured to generate magnetic flux when current is applied to a coil 122.

The center portion of the stator 120 may be provided with a rotor accommodation portion 121 for accommodating the rotor 130.

The rotor 130 may be disposed in the rotor accommodation portion 121 of the stator 120. The rotor 130 may electromagnetically interact with the stator 120. The rotor 130 may include a rotation shaft 131 and bearings 132 and 133.

The rotation shaft 131 may be provided so that the rotor 130 is rotated when electromagnetically interacting with the stator 120.

The bearings 132 and 133 may include a first bearing 132 configured to couple to the upper side of the rotation shaft 131 and a second bearing 133 configured to couple to the lower side of the rotation shaft 131.

The first bearing 132 may be disposed between a first housing 141 and the rotation shaft 131 and may support the rotation shaft 131 to rotate with an axis of the rotation shaft 131 in a fixed state.

The second bearing 133 may be disposed between a second housing 145 and the rotation shaft 131 and may support the rotation shaft 131 to rotate with the axis of the rotation shaft 131 in a fixed state.

The housings 141 and 145 may be provided to couple with the stator 120.

The housings 141 and 145 may include the first housing 141 and the second housing 145.

The first housing 141 and the second housing 145 may be coupled with the rotor 130 and the stator 120 placed therebetween. Based on coupling the first housing 141 and the second housing 145, the rotor 130 may be fixed to the stator 120.

The first housing 141 may include a first bearing mounting portion 142 configured so that the first bearing 132 is mounted, and a first coupling portion 143 configured to extend in an axial direction and couple with the second housing 145.

The first coupling portion 143 may be configured to extend from the outer circumferential surface of the first housing to the axial direction. The first coupling portion 143 may be provided to be spaced apart along the circumferential direction of the first housing 141, and may be provided in plurality. For example, as illustrated in FIG. 3, there may be three first coupling portions 143 provided, but the number may be changed.

The second housing 145 may include a second bearing mounting portion 146 provided so that the second bearing 133 is mounted and a second coupling portion 147 provided so as to couple with the first coupling portion 143 of the first housing 141.

The second coupling portion 147 may be provided to correspond with a number of first coupling portions 143. The first coupling portion 143 and the second coupling portion 147 may be coupled by various known methods. For example, the first coupling portion 143 and the second coupling portion 147 may be coupled by a forcibly fitted coupling.

The motor assembly 100 may include the impeller 170 configured to couple to the rotation shaft 131 of the rotor 130 and generate movement of air.

The impeller 170 may include a shaft coupling portion 232 configured so that the rotation shaft 131 is coupled. Based on the rotation shaft 131 being coupled to the shaft coupling portion 232, the impeller 170 may be configured to rotate with the rotation shaft 131.

The cover 180 may be provided to cover the impeller 170. The cover 180 may be configured to couple with the first housing 141. The cover 180 may include an inlet 181 through which air is introduced by the impeller 170.

The vibration isolator 150 may be provided to minimize the vibration of the motor 110 which is transferred from the motor 110 to the body 10. The vibration isolator 150 may be configured to couple to the other side of the motor 110.

The vibration isolator 150 may include a side surface cover portion 151 configured to surround the side surface of the motor 110, a motor support portion 152 configured to support the motor 110 by being extendedly formed to the inside of the side surface cover portion 151, and a plurality of support protrusions 155 configured to support the motor case 11 by being protrudingly formed to the outside of the side surface cover portion 151.

The vibration isolator 150 may be formed in an elastic material so as to absorb the vibration generated in the motor 110. For example, the vibration isolator 150 may be comprised of an elastomer such as rubber, urethane, or silicone.

The side surface cover portion 151 may be formed in a ring shape having openings at the upper side and lower side so as to surround the side surface of the motor 110. The side surface cover portion 151 may be disposed to be spaced apart from the side surface of the motor 110 by a certain distance. A diameter of the side surface cover portion 151 may be configured to be greater than a diameter of the motor 110.

The side surface cover portion 151 may be supported by the cover 180, and formed to be spaced apart from the side surface of the motor 110 by a predetermined distance. Specifically, the upper end of the side surface cover portion 151 may be supported by the cover 180.

Because the side surface cover portion 151 is formed so as to not be in contact with the motor 110, a radial vibration of the motor 110 may not be transferred through the side surface cover portion 151. That is, the radial vibration of the motor 110 may only be transferred by the motor support portion 152 of the vibration isolator 150 which will be described below.

The motor support portion 152 may be configured to support the motor 110, which is the source of the vibration. The motor support portion 152 may be extendingly formed from the lower end of the side surface cover portion 151 to the inside direction.

The motor support portion 152 may be provided to support the other end of the motor 110. The motor support portion 152 may be formed so as to accommodate a portion of the other end of the motor 110. The motor support portion 152 may be formed to support the second bearing mounting portion 146 and the second coupling portion 147 of the second housing 145 so as to correspond to the second housing 145.

The detailed structure of the motor support portion 152 will be described below.

The plurality of support protrusions 155 may be protrudingly formed from the side surface cover portion 151 to the outside direction. Each of the plurality of support protrusions 155 may be configured to couple with the motor case 11. Specifically, the coupling portion 13 formed at the second motor case 11*b* may be insertion coupled to the plurality of support protrusions 155. The coupling portion 13 may be protrudingly formed in a coupling direction which the motor assembly 100 is coupled.

The plurality of support protrusions 155 may be disposed between the motor 110 and the motor case 11. The motor may be in point contact with the motor case 11 which comprise one configuration of the body 10 without being in contact as a whole by the plurality of support protrusions 155.

In addition, the plurality of support protrusions 155 may be formed to have a maximum spacing distance with the motor support portion 152. The detailed structure of the support protrusion 155 will be described below.

The vibration of the motor 110 being transferred to the body may be minimized by the plurality of support protrusions 155.

Because the vibration isolator 150 is in contact with the motor 110 by only the motor support portion 152, the vibration of the motor may be received through the motor support portion 152. The vibration of the motor 110 transferred to the motor support portion 152 may be dispersed through the side surface cover portion 151.

In addition, the vibration isolator 150 may be in contact with the body 10 by only the plurality of support protrusions 155, and the plurality of support protrusions 155 may be formed to have a maximum spacing distance with the motor support portion 152. Accordingly, the vibration of the motor 110 received from the motor support portion 152 may be absorbed or dispersed through the vibration isolator 150 prior to being transferred to the body 10 by the support protrusion 155. The vibration of the motor 110 may be minimized from being transferred to the body 10 by the vibration isolator 150.

The motor assembly 100 may further include a substrate 190 which is provided to control a speed of the motor. The substrate 190 may be disposed at the lower portion of the motor, but is not limited thereto. The substrate 190 may be disposed at various positions according to the type of the cleaner.

Figure 5:
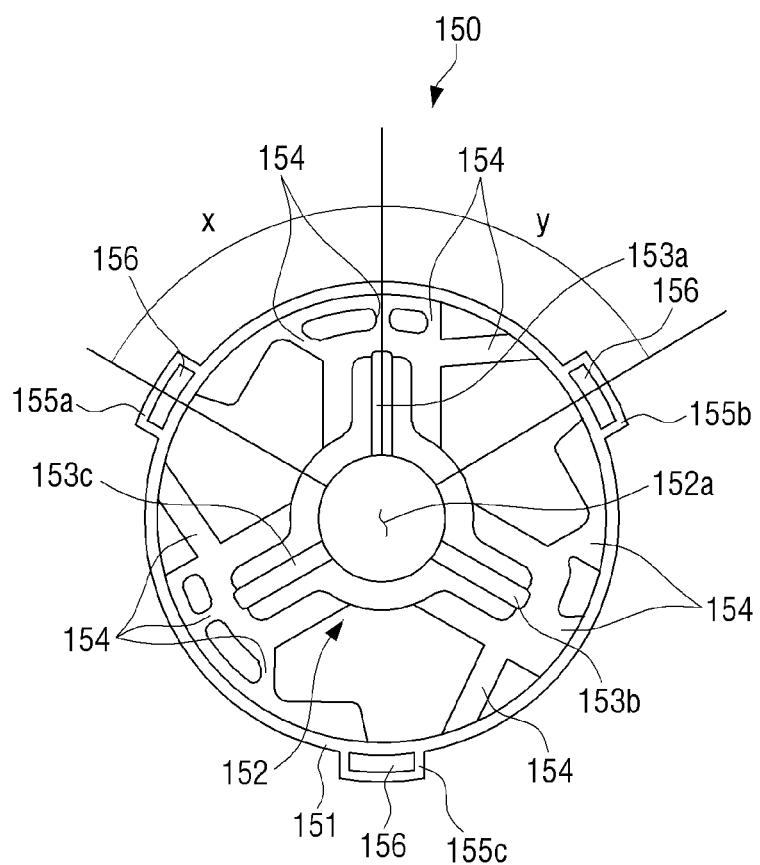
FIG. 5 is a front view illustrating a motor assembly according to an embodiment of the disclosure.

FIG. 5 is a front view illustrating a vibration isolator according to an embodiment of the disclosure.

Referring to FIG. 5, the vibration isolator 150 may include the plurality of support protrusions 155 supporting the motor case 11 when the side surface cover portion 151 forming the accommodation space in which the motor 110 is accommodated inside and the motor support portion 152 and the motor assembly 100 supporting the one side of the motor 110 are assembled in the body 10.

The side surface cover portion 151 may be formed in a ring shape with openings formed at the upper side and the lower side. The motor 110 may be accommodated within the vibration isolator 150 through the upper side opening of the side surface cover portion 151.

The lower side of the side surface cover portion 151 may be formed with the motor support portion 152 which is extendingly formed from the side surface cover portion 151 to the inside.

The motor support portion 152 may include a motor accommodation branch 153 supporting the rear-end of the motor 110 and a plurality of connection branches 154 connecting the side surface cover portion 151 and the motor accommodation branch 153.

The motor accommodation branch 153 may be provided to accommodate a portion of the other side of the motor 110. The motor accommodation branch 153 may be formed to correspond to the second housing 145 which is coupled to the other side of the motor 110. Specifically, the motor accommodation branch 153 may be provided to correspond to the second coupling portion 147 of the second housing 145.

For example, as illustrated in FIG. 5, three motor accommodation branches 153 may be provided to correspond to the number of the second coupling portions 147, and may be disposed spaced apart to correspond to a spacing angle of the second coupling portion 147. That is, the motor accommodation branch 153 may be comprised of a first motor accommodation branch 153*a*, a second motor accommodation branch 153*b*, and a third motor accommodation branch 153*c*, which are disposed spaced apart by a certain distance.

The motor accommodation branch 153 may be disposed to form the same angle with one another. The spacing angle between the motor accommodation branches 153 may be comprised at a 120 degree.

In addition, the inside end of the motor accommodation branch 153 may be connected to form a coupling through-hole 152a through which the second bearing mounting portion 146 of the second housing 145 is insertingly disposed at the center thereof.

The plurality of connection branches 154 may be disposed between the motor accommodation branch 153 and the side surface cover portion 151. The motor accommodation branch 153 may be connected with the side surface cover portion 151 through the plurality of connection branches 154.

The plurality of connection branches 154 may be disposed from the outside end of the motor accommodation branch 153 to a radial shape. The plurality of connection branches 154 may be formed to have a pre-set distance from one another, and a through-hole may be formed in-between the adjacent connection branches 154 from among the plurality of connection branches 154.

The motor support portion 152 may include a plurality of through-holes through which air introduced by the impeller may be discharged by the motor accommodation branch 153 and the plurality of connection branches 154.

The other side of the vibration isolator 150 may be formed to include the plurality of through-holes because of the motor accommodation branch 153 and the plurality of connection branches 154. That is, the vibration isolator 150 may be formed in a mesh structure having a net shape.

By coupling the vibration isolator 150 which is formed in a mesh structure to the motor 110, a rigidity of the vibration isolator 150 may be reduced and a natural frequency of the motor assembly 100 may be lowered. Because the vibration isolator 150 decreases the rigidity which cannot be overcome with the material itself through the mesh structure, the natural frequency of the motor assembly 100 is lowered and the vibration generated in the motor 110 may not be effectively transferred to the body 10.

The plurality of support protrusions 155 may be extendingly formed from the side surface cover portion 151 to the outside. The plurality of support protrusions 155 may be formed on the outer circumferential surface of the side surface cover portion 151.

The plurality of support protrusions 155 may support between the motor case 11 and the motor assembly 100, when the motor assembly 100 couples to the body 10. The plurality of support protrusions 155 may space apart the motor assembly 100 from the motor case 11 by a certain distance.

The plurality of support protrusions 155 may be coupled so as to be engaged to the coupling portion 13 of the motor case 11. The plurality of support protrusions 155 may include an insertion groove 156 through which the coupling portion 13 of the second motor case 11b is inserted.

The motor assembly 100 may be engagingly coupled to the motor case 11 by the plurality of support protrusions 155 of the vibration isolator 150.

The plurality of support protrusions 155 may be disposed spaced apart by a certain angle from one another. The support protrusion 155 may be formed in plurality, and preferably comprised of three protrusions to stably dispose the motor assembly 100 in the motor case 11. For example, referring to FIG. 5, the plurality of protrusions may be comprised of a first support protrusion 155a, a second support protrusion 155b, and a third support protrusion 155c.

Each of the plurality of support protrusions 155 may be disposed to have a maximum spacing angle with respect to the motor accommodation branch 153. For example, the first support protrusion 155a may be formed to have a maximum spacing angle (x) with the first motor accommodation branch 153a, and the second support protrusion 155b may be formed to have a maximum spacing angle (y) with the first motor accommodation branch 153a.

In order for each of the motor accommodation branches 153a, 153b and 153c and the plurality of protrusions 155a, 155b and 155c to have the maximum spacing angle, each of the motor accommodation branches 153a, 153b and the plurality of protrusions 155a, 155b and 155c may be disposed at the same angle with one another. That is, it may be preferable for the first support protrusion 155a and the second support protrusion 155b to be disposed spaced apart so as to have a distance of 120 degrees, the first support protrusion 155a and the first motor accommodation branch 153a to have a distance of 60 degrees, and first support protrusion 155a and the first motor accommodation branch 153a to be formed so as to have a distance of 60 degrees.

Because the vibration isolator 150 is in contact with the motor 110 by only the motor support portion 152, the vibration of the motor 110 may be received through the motor support portion 152. The vibration of the motor 110 transferred through the motor support portion 152 may be transferred to the body 10 by the plurality of support protrusions 155.

At this time, because the plurality of support protrusions 155 of the vibration isolator 150 according to an embodiment of the disclosure is formed to have a maximum spacing distance with the motor support portion 152, the motor vibration transferred to the vibration isolator 150 through the motor support portion 152 may be dispersed to various branches through the plurality of connection branches 154, and absorbed through the side surface cover portion 151. In addition, transferring the motor vibration transferred to the support protrusion 155 to the body 10 which is in point contact with the support protrusion 155 may not be easy. The motor vibration being transferred to the body 10 may be minimized through the vibration isolator 150.

Figure 6:
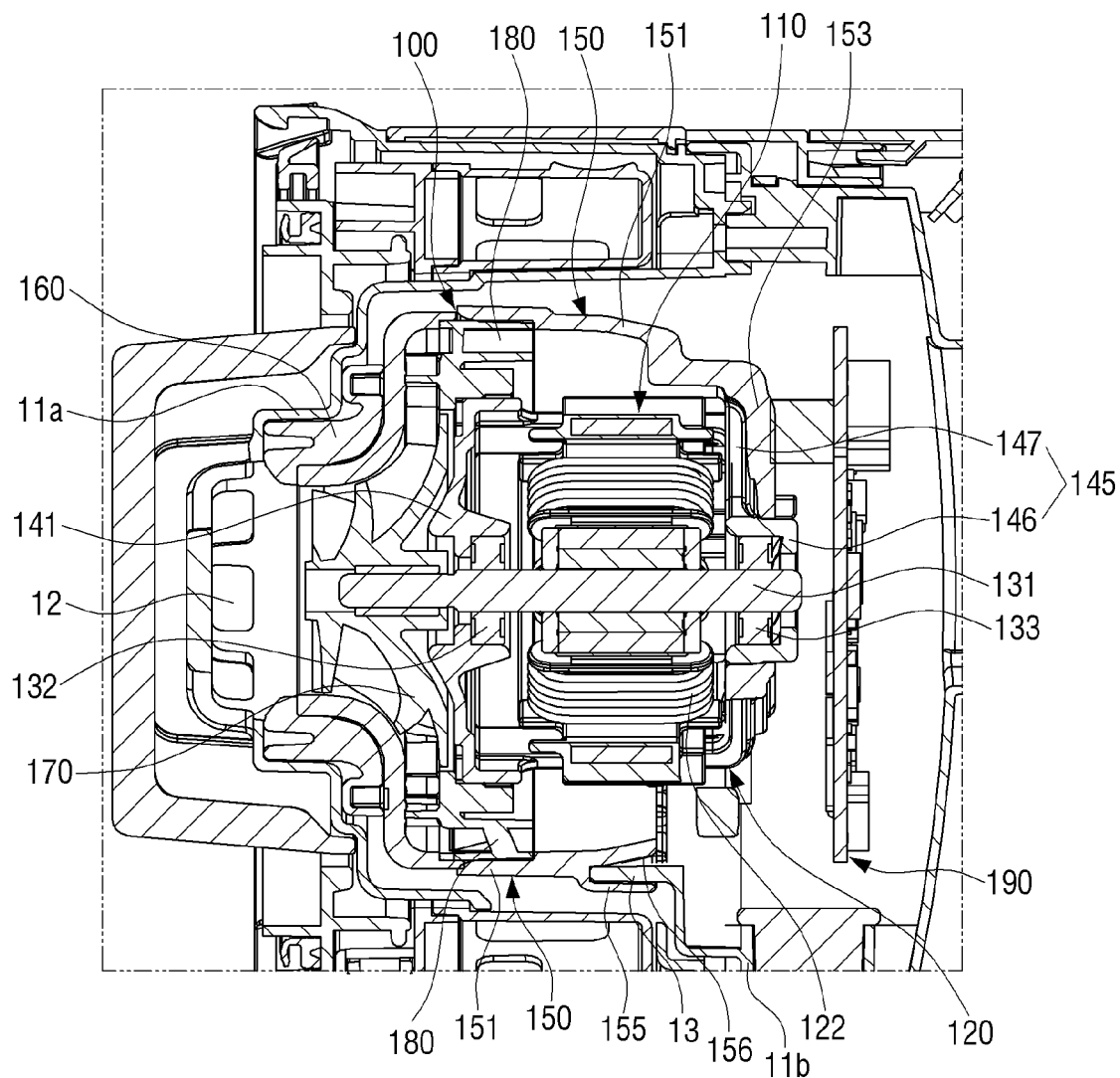
FIG. 6 is a view illustrating a portion of a cross-sectional view taken along 'VI-VI' indicated in FIG. 2.

FIG. 6 is a view illustrating a portion of a cross-sectional view taken along 'VI-VI' indicated in FIG. 2.

Referring to FIG. 6, the motor assembly 100 may be mounted to the body 10 of the cleaner 1. Specifically, the motor assembly 100 may be coupled with the motor case 11 and mounted to the body 10.

The first motor case 11a may be coupled to the upper side of the motor assembly 100, and the second motor case 11b may be coupled to the lower side of the motor assembly 100.

The first motor case 11a may include an opened motor suction port 12. The first motor case 11a and the motor assembly 100 may be disposed spaced apart by an additional vibration isolator 160.

The additional vibration isolator 160 may reduce the vibration in the axial direction of the motor 110. The additional vibration isolator 160 may include a protrusion portion 161 for point contacting with the first motor case 11a.

The protrusion portion 161 may be formed to support one end in a suction direction of the impeller 170 and disposed so that the impeller 170 does not direct contact the first motor case 11a. The motor suction port 12 of the first motor case 11a may be disposed spaced apart by a predetermined distance with the cover 180 in which the impeller 170 is disposed inside because of the additional vibration isolator 160. Specifically, the motor assembly 100 may be disposed spaced apart from the first motor case 11a by the height of the protrusion portion 161.

The additional vibration isolator 160 may be formed in an elastic material so as to absorb the vibration in the axial direction generated in the motor 110. For example, the additional vibration isolator 160 may be comprised of an elastomer such as rubber, urethane, or silicone.

The vibration in the axial direction of the motor which is transferred to the body by the additional vibration isolator 160 may be minimized.

In addition, the second motor case 11b and the motor assembly 100 may be disposed spaced apart by the vibration isolator 150.

The vibration isolator 150 may be configured so that the support protrusion 155 is in point contact with the motor case 11 in an hanging up structure to the second motor case 11b at some areas. The vibration isolator 150 may include a support protrusion 155 formed in a protrusion shape to minimize contact with the motor case 11. The coupling portion 13 formed at the second motor case may be coupled in an engagement method to the insertion groove 156 which is formed at the support protrusion 155.

Based on the vibration isolator 150 and the motor case 11 being coupled by point contact, the contact area between the vibration isolator 150 and the motor case 11 may be minimized and the vibration of the motor may not be transferred to the body 10.

The motor assembly 100 may be in contact with the second motor case 11b by the support protrusion 155. For example, based on there being three support protrusions 155 formed, the vibration isolator 150 may be in a three point contact with the motor case 11. The vibration isolator 150 may not only minimize the area contacting with the motor case 11 but also stably support the motor assembly 100 to the motor case 11 by the support protrusions 155 comprised in three.

The vibration isolator 150 may be in contact with the motor 110 at only the motor support portion 152. The lower end of the vibration isolator 150 may be configured to support the lower side of the motor 110 by the motor support portion 152.

The motor support portion 152 may be formed to correspond to the second housing 145 which is coupled to the lower side of the motor 110. The motor support portion 152 may form the coupling through-hole 152a at the center portion through which the second bearing mounting portion 146 of the second housing 145 is insertion coupled, and include the plurality of motor accommodation branches 153 corresponding to the second coupling portion 147 of the second housing 145.

The vibration isolator 150 may receive the vibration of the motor 110 only through the plurality of motor accommodation branches 153

Meanwhile, the upper end of the vibration isolator 150 may be supported by the cover 180. Because the side surface cover portion 151 of the vibration isolator 150 is contact supported only by the cover 180, it may be disposed spaced apart with the motor 110. Accordingly, the radial vibration of the motor may be transferred only through the motor support portion 152, and may not be directly transferred to the side surface cover portion 151.

The vibration of the motor transferred through the motor accommodation branch 153 may be dispersed through the plurality of connection branches 154 and transferred to the side surface cover portion 151, and the vibration of the motor transferred to the side surface cover portion 151 may be transferred to the support protrusion 155 of the side surface cover portion 151 along the side surface cover portion 151.

The vibration of the motor may be absorbed or dispersed by the motor accommodation branch 153, the plurality of connection branches 154, the side surface cover portion 151, and the support protrusion 155 member during the process of being transferred to the support protrusion 155. Accordingly, the vibration of the motor itself which is transferred to the support protrusion 155 may be minimized.

In addition, because the support protrusion 155 and the motor case 11 are in point contact at a minimum point, the vibration of the motor transferred from the support protrusion 155 to the motor case 11 may be minimized.

Because of the vibration isolator 150 having the above-described structure, the transference of motor vibration may be minimized, and the vibration noise may be minimized.

In the above, the disclosure has been described in an example method. The terms used herein are for describing the embodiments, and should not be understood as limitative. Various changes in form and detail may be made in the disclosure according to the descriptions above. Accordingly, unless otherwise specified, the disclosure may be freely realized without departing from the true spirit and full scope of the disclosure, including the appended claims and their equivalents.

What is claimed is:

1. A cleaner, comprising:
    a body;
    a suction head configured to connect to one side of the body, and suction a foreign matter of a surface to be cleaned;
    a motor case disposed on an other side of the body; and
    a motor assembly accommodated in the motor case and configured to generate suction force,
    wherein the motor assembly comprises:
        a motor;
        an impeller disposed at the one side of the motor and configured to introduce air by being connected with the motor; and
        a vibration isolator member configured to couple to the other side of the motor and to minimize vibration of the motor transmitted to the body,
    wherein the vibration isolator comprises:
    a side surface cover portion configured to surround a side surface of the motor;
    a plurality of support protrusions formed to protrude from an outer circumferential surface; and
    a motor support portion configured to be extendingly formed to an inside of the side surface cover portion and support the other side of the motor,
        wherein the motor assembly is coupled to the motor case by the plurality of support protrusions of the vibration isolator.

2. The cleaner of claim 1, wherein the motor assembly further comprises:
    a cover comprising an inlet through which air is introduced by the impeller, and configured to cover the impeller,
    wherein the side surface cover portion is supported by the cover and is spaced apart from the side surface of the motor.

3. The cleaner of claim 1, wherein the plurality of support protrusions comprises a first support protrusion, a second support protrusion, and a third support protrusion which are disposed spaced apart at a mutually same angle.

4. The cleaner of claim 1, wherein the motor support portion comprises:
    a motor accommodation branch configured to accommodate a portion of the other side of the motor; and a plurality of connection branches configured to connect the side surface cover portion with the motor accommodation branch.

5. The cleaner of claim 4, wherein the connection branches are configured to be disposed radially between the motor accommodation branch and the side surface cover portion.

6. The cleaner of claim 1, wherein the motor support portion comprises a plurality of through-holes configured so that air introduced by the impeller is discharged.

7. The cleaner of claim 4, wherein the motor accommodation branch comprises a plurality of motor accommodation branches, and wherein the plurality of motor accommodation branches and the plurality of support protrusions are arranged to be spaced apart from each other at a maximum angle.

8. The cleaner of claim 7, wherein the plurality of motor accommodation branches comprise a first motor accommodation branch, a second motor accommodation branch, and a third motor accommodation branch which are disposed spaced apart at mutually same angles, wherein the plurality of support protrusions comprise a first support protrusion, a second support protrusion, and a third support protrusion which are disposed spaced apart at mutually same angles, and wherein an angle between the motor accommodation branches and the support protrusions adjacent to each other is 60 degrees.

9. The cleaner of claim 1, wherein the motor case comprises a plurality of coupling portions configured to be protrudingly formed in a coupling direction of the motor assembly, and couple with each of the plurality of support protrusions.

10. The cleaner of claim 2, wherein the motor assembly further comprises:

an additional vibration isolator member disposed between the cover and the motor case, and configured to space apart the motor from the motor case.

11. The cleaner of claim 10, wherein the additional vibration isolator member comprises a protrusion portion protrudingly formed along an inlet of the cover.

12. A motor assembly, comprising:

a motor;

an impeller disposed at one side of the motor and configured to introduce air by being connected with the motor; and a vibration isolator member coupled to an other side of the motor and configured to minimize transmission of vibration of the motor, wherein the vibration isolator comprises:

a side surface cover portion configured to surround a side surface of the motor;

a plurality of support protrusions formed to protrude from an outer circumferential surface; and a motor support portion configured to be extendingly formed to an inside of the side surface cover portion and support the other side of the motor.

* * * * *